United States Patent [19]

Beinhaur

[11] 4,406,060

[45] Sep. 27, 1983

[54] ANODE COVER ASSEMBLY HAVING INTERNAL SUPPORT MEMBER

[75] Inventor: Ernest L. Beinhaur, Harrisburg, Pa.

[73] Assignee: AMP Incorporated, Harrisburg, Pa.

[21] Appl. No.: 291,586

[22] Filed: Aug. 10, 1981

[51] Int. Cl.³ ........................ H01R 43/00; B23P 19/02

[52] U.S. Cl. ........................................ 29/855; 174/135; 174/74 A; 29/235; 339/101

[58] Field of Search .......................... 29/235, 240, 855; 174/74 A, 84 S, 135, 138 F, 84 C; 339/101

[56] References Cited

U.S. PATENT DOCUMENTS

| | | | |
|---|---|---|---|
| 1,705,159 | 3/1929 | Rouse | 174/74 A |
| 1,898,064 | 2/1933 | Ridge | 339/101 X |
| 2,883,220 | 4/1959 | Johnson | 174/84 C X |
| 3,047,651 | 7/1962 | Hawkes | 174/84 S |
| 3,274,330 | 9/1966 | Becker et al. | 29/450 X |
| 3,824,331 | 7/1974 | Mixon, Jr. et al. | 174/135 |
| 3,878,320 | 4/1975 | Mixon, Jr. et al. | 174/135 |

FOREIGN PATENT DOCUMENTS

| | | | |
|---|---|---|---|
| 1051407 | 2/1959 | Fed. Rep. of Germany | 339/101 |
| 217347 | 6/1924 | United Kingdom | 29/450 |

*Primary Examiner*—Howard N. Goldberg
*Assistant Examiner*—Carl J. Arbes
*Attorney, Agent, or Firm*—F. Brice Faller

[57] ABSTRACT

A resilient boot 10 used to cover the axial juncture between a cable 40 and an anode 30 is supported in a rolled and stretched condition on a hollow support member 20 which has a flange 28 to removably retain the tubular section 16 of the boot 10 in roll form 18 and a flange 23 to removably retain the sleeve section 12 of the boot 10 in roll form 14. The support member 20 is assembled over the juncture and roll 18 is unrolled so that tubular section 16 conforms snugly to the cable 40 and roll 14 is unrolled so that sleeve section 12 conforms snugly to the anode 30. The tubular section 27 of the support member 20 removed stresses at the juncture which results from lateral movement of the cable.

3 Claims, 9 Drawing Figures

ANODE COVER ASSEMBLY HAVING INTERNAL SUPPORT MEMBER

BACKGROUND OF THE INVENTION

The present invention relates to an insulated, waterproof cover for the connection between an electrical cable and a sacrificial anode for underground use.

Underground metal pipe is subject to corrosion due to the presence of water in the surrounding soil. The water acts as an electrolyte and the pipe develops a slight potential difference between various sections, which causes some areas to behave as anodes and some as cathodes. The metal passes into solution at the anodes to form a metal oxide or hydroxide and release hydrogen as in a battery, the reaction being primarily electrochemical in nature. A traditional means of combating pipe corrosion is to cause the pipe to behave as a cathode by electrically connecting the pipe to a material anodic to the pipe, which causes the anode to preferentially corrode. Materials such as zinc or carbon are often used as sacrificial anodes to protect iron pipe, and a slight current is provided to charge the pipe to a negative voltage. An increase in resistance provides notice that a sacrificial anode is thoroughly corroded and must be replaced in order to protect the pipe.

Carbon anodes are popular for such cathodic protection and are commonly manufactured by providing a bore in the end of a cylindrical carbon rod and inserting the exposed end of an insulated electrical cable into the bore and completing the electrical connection with molten lead between the exposed conductor and the carbon. The connection must then be sealed to prevent the anodic reaction which would result from the intrusion of moisture. One seal presently available is a boot profiled to fit over the end of the carbon rod, the boot having an extended tubular section profiled to fit around the cable. The boot is of heat recoverable material and is designed to fit loosely for ease in application, the boot subsequently being shrunk by application of heat. In such a device, lateral movement of the wire causes it to bend where it enters the bore in the anode, causing stress on the boot at the juncture with the tubular section.

SUMMARY OF THE INVENTION

The present invention utilizes a resilient boot supported in a stretched condition by a support member which is profiled to fit snugly onto the end of an anode. The support member has a sleeve section which actually fits on the anode and a tubular section which is profiled to accommodate the cable. The boot is supported in a rolled condition on the support member and is unrolled at each end of the support member to resiliently seal the anode after the support member is placed on the end of the anode.

The present invention offers the advantage of ease in application insofar as a heat source is not needed, and further offers a structural advantage insofar as the bending moment resulting from lateral cable movement is removed from the juncture of the anode and the cable.

DETAILED DESCRIPTION OF THE PREFERRED EMBODIMENT

Figure 1:
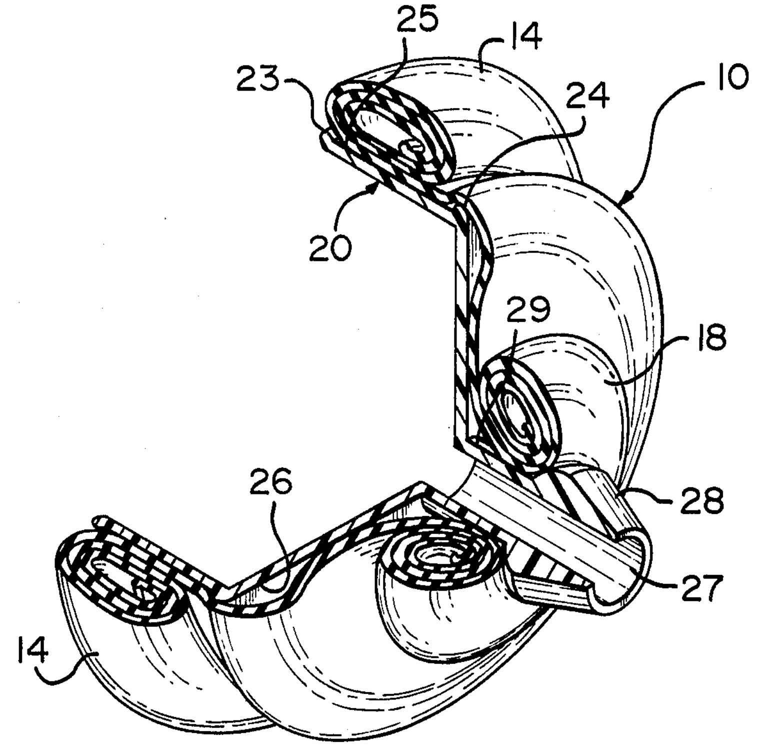
FIG. 1 is a sectional perspective of the boot assembled to the support member.

FIG. 1 shows the boot 10 as assembled to the support member 20. The boot 10 is molded of a resilient material such as butyl rubber and is rolled at one end into a roll 14 and at the other end into a roll 18. The support member 20 comprises a sleeve section 22 and a tubular section 27. Roll 14 is stretched onto surface 25 between bottom flange 23 and top flange 24 while roll 18 is stretched onto surface 29 between top surface 26 and conical flange 28.

Figure 2:
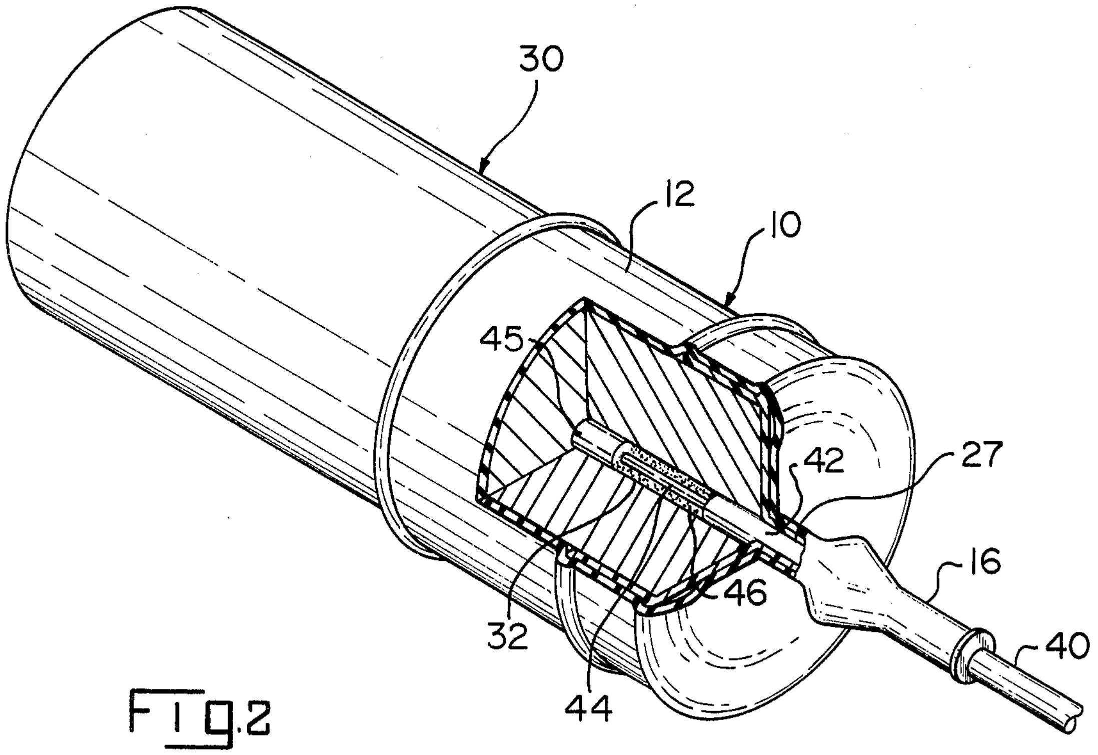
FIG. 2 is a sectional perspective of the boot assembled to an anode.

FIG. 2 shows the boot 10 as assembled to an anode 30. The cable 40 has been preassembled to the anode 30 by insertion in bore 32. Insulation 42 is stripped from the cable 40 to expose conductor 44 which is electrically bonded to the anode using solder 45, and any remaining space in the bore 32 is filled by a filler 46. The boot 10 is assembled to the anode 30 by taking the assembly of FIG. 1 and slipping it over the anode so that the cable 40 extends through the tubular section 27 of the support member 20 and the sleeve section 22 fits snugly over the anode 30. The roll 14 is unfurled over bottom flange 23 of the support member 20 until the sleeve section 12 of the boot 10 conforms snugly to the anode 30. The roll 18 is unfurled over the conical flange 28 of the support member 20 until the tubular section 16 conforms snugly to the cable 40. The snug fit and resultant moisture seal are effected by the resiliency of the boot, which is preferentially molded of butyl rubber.

Figure 3A:
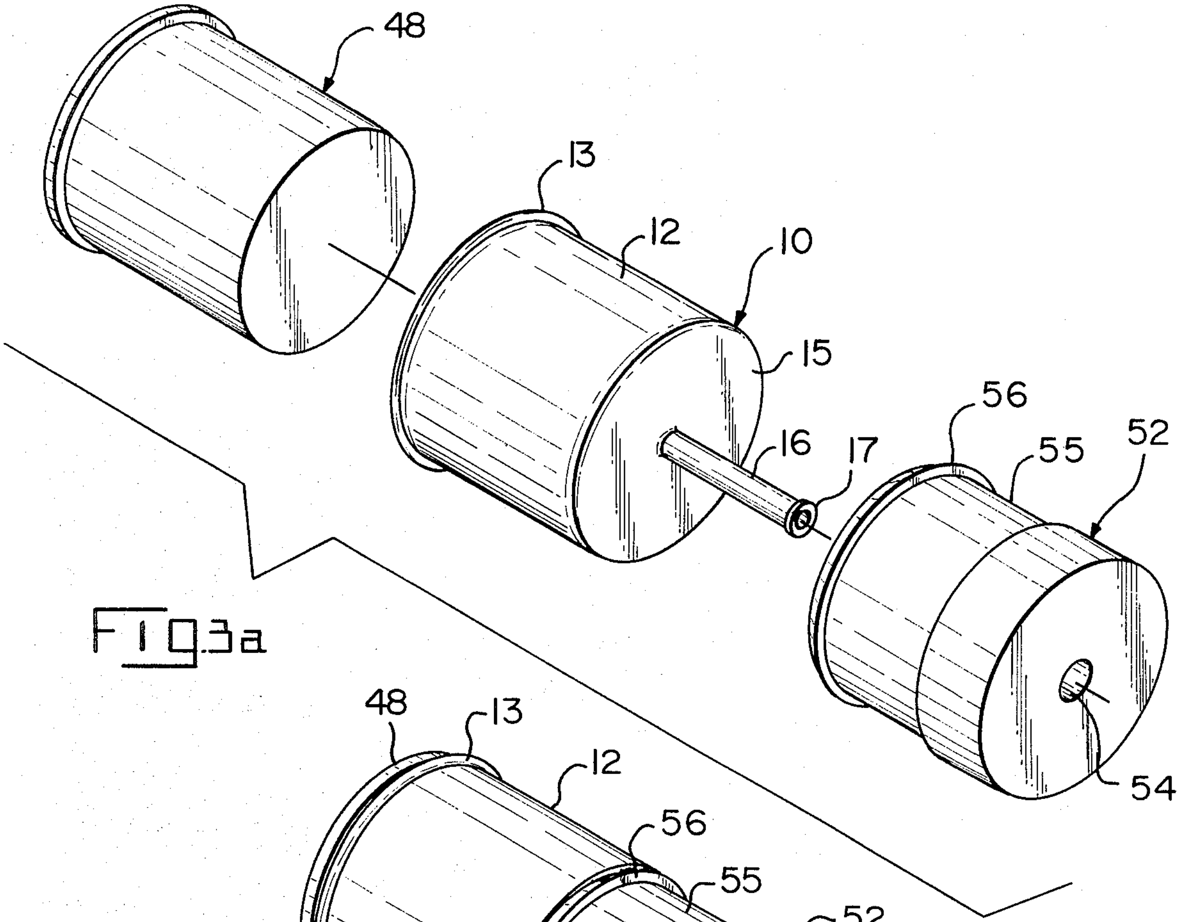
FIGS. 3A–3G show the sequence of the boot being assembled to the support member.
Figure 3B:
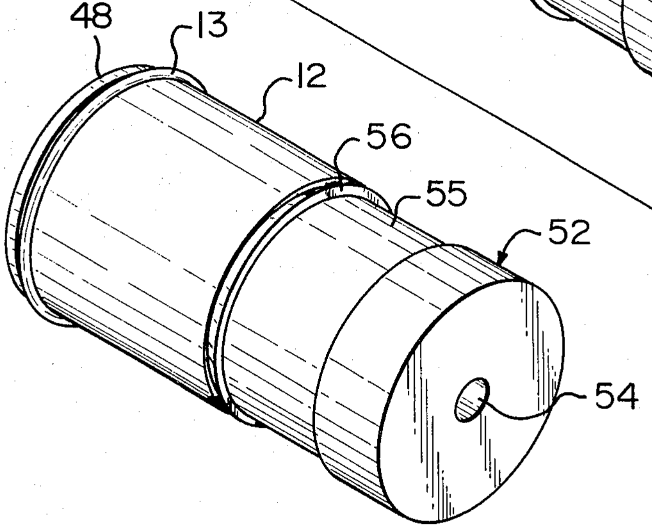
Figure 3C:
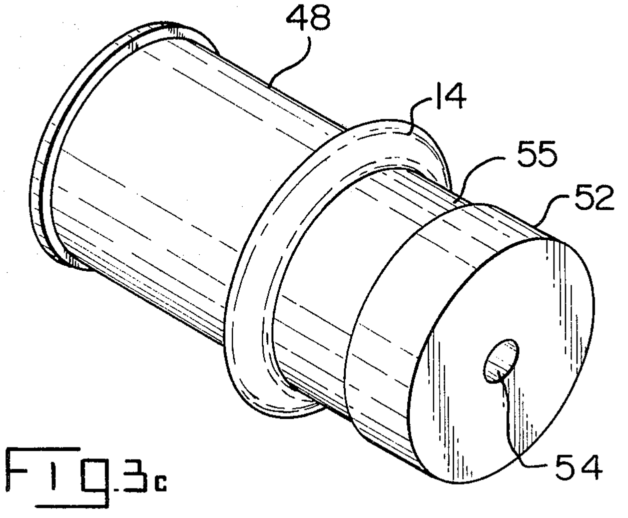
Figure 3D:
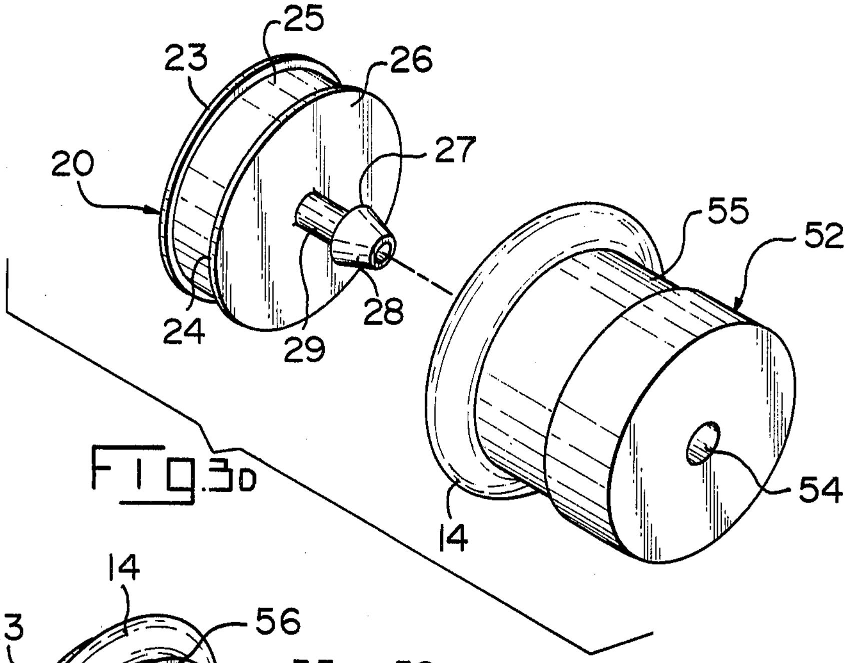
Figure 3E:
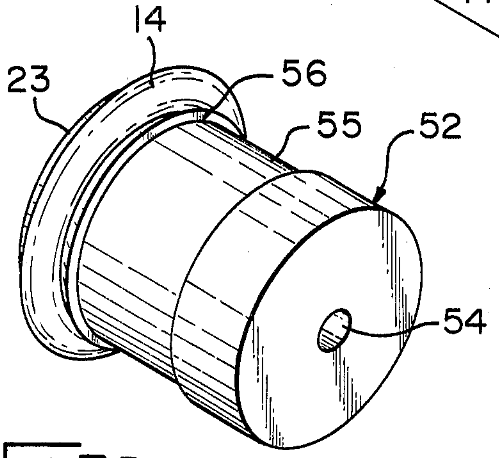

FIGS. 3A et seq show the sequence of assembly of boot 10 to support member 20. FIG. 3A depicts cylindrical plug member 48, which is of slightly smaller diameter than the inside of sleeve section 12 of boot 10. Spool 52 has a bore 54 passing therethrough which is sized to accommodate the tubular section 16 of boot 10. The spool 52 has flange 56 at one end and a cylindrical support surface adjacent thereto which is about the same diameter as plug member 48. FIG. 3B shows the boot 10 with plug member 48 inserted into sleeve section 12 and spool 52 against cap 15 with tubular section 16 passing into bore 54. Bottom flange 13 is then folded onto the sleeve section 12 and the sleeve section 12 is rolled toward spool 52 to form roll 14 as shown in FIG. 3C. Roll 14 is rolled off of plug member 48 and over flange 56 onto support surface 55 of spool 52. In FIG. 3D, the cylindrical plug 48 has been removed and support member 20 is poised for insertion of tubular section 27 into bore 54. The conical flange 28 passes into bore 54, stretching its way into the tubular section 16 of boot 10 (not visible), until top surface 26 is against the cap 15 of the boot 10 (not visible). The roll 14 is then rolled backward over flange 56 of the spool 52 and flange 24 of the support member 20 to rest on support surface 25, as shown in FIG. 3E.

Figure 3F:
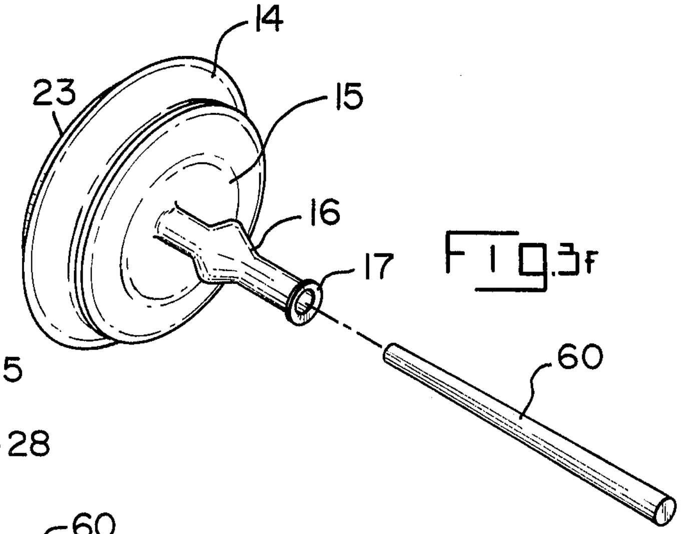
Figure 3G:
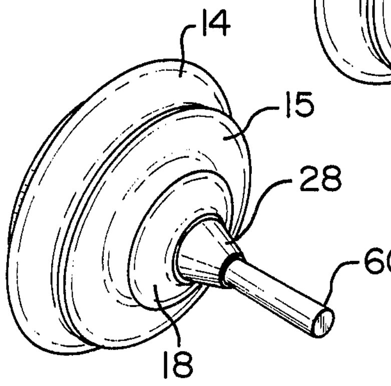

In FIG. 3F, the spool 52 has been removed and the tubular section 16 of boot 10 is shown stretched over the conical flange 28 of the support member 20. Rod 60 is poised for insertion in tubular section 16, and the next step is to insert the rod 60 and fold the tip flange 17 onto the tubular section 16 and roll the tubular section 16 toward cap 10 to form roll 18 as shown in FIG. 3G. The assembly is now complete, with roll 18 residing on support surface 29 between conical flange 28 and top surface 26 of the support member 20 while roll 14 resides on support surface 25 between the bottom flange 23 and top flange 24 of the support member 20. The assembly is now ready for installation on an anode as previously described.

While the preferred embodiment described above is directed to an anode boot, other embodiments for protection of other junctures are within the scope of the claims which follow and should be apparent to those skilled in the art.

I claim:

1. A cover assembly for covering an axial juncture between a cable and a cylindrical member of substantially larger diameter than said cable, comprises:

a hollow support member having a tubular section profiled on the inside to fit closely around said cable and a sleeve section profiled on the inside to fit closely around said cylindrical member, a stretched resilient boot on the outside of said support member, said boot having a tubular section profiled to fit resiliently around said cable and a sleeve section profiled to fit resiliently around said cylindrical member, said tubular section of said boot being supported in a rolled condition on said tubular section of said support member, said sleeve section of said boot being supported in a rolled condition on said sleeve section of said support member, whereby, said support member may be assembled onto the juncture between a cable and a cylindrical member, said tubular section of said boot may be unrolled from the support member onto the cable and the sleeve section may be unrolled from the support member onto the cylindrical member.

2. The cover assembly of claim 4 wherein the support member includes flanges at each end thereof to removably retain said rolled boot.

3. A method of assembling a cover assembly to an axial juncture between a cable and a cylindrical member of substantially larger diameter than said cable comprising the steps of:

a. providing a hollow support member having a tubular section profiled to fit closely around said cable and a sleeve section profiled to fit closely around said cylindrical member;

b. positioning a resilient boot onto said support member in a stretched condition, said boot having a tubular section which is rolled onto the tubular section of said support member and a sleeve section which is rolled onto the sleeve section of said support member;

c. positioning said support member onto the juncture between the cable and the cylindrical member;

d. unrolling the tubular section of the boot from the support member onto the cable and unrolling the sleeve section of the boot from the support member onto the cylindrical member.

* * * * *

UNITED STATES PATENT OFFICE
CERTIFICATE OF CORRECTION

Patent No. 4,406,060 Dated September 27, 1983

Inventor(s) Ernest L. Beinhaur

It is certified that error appears in the above-identified patent and that said Letters Patent are hereby corrected as shown below:

Column 4, line 5 (first line of claim 2), "claim 4" should be changed to ---claim 1---.

Signed and Sealed this

*Seventeenth* Day of *January 1984*

[SEAL]

*Attest:*

GERALD J. MOSSINGHOFF

*Attesting Officer*

*Commissioner of Patents and Trademarks*